Nov. 20, 1951  R. I. PRUPIS  2,575,502
QUICK DISASSEMBLY SLIDE FASTENER
Filed April 5, 1949  3 Sheets-Sheet 1
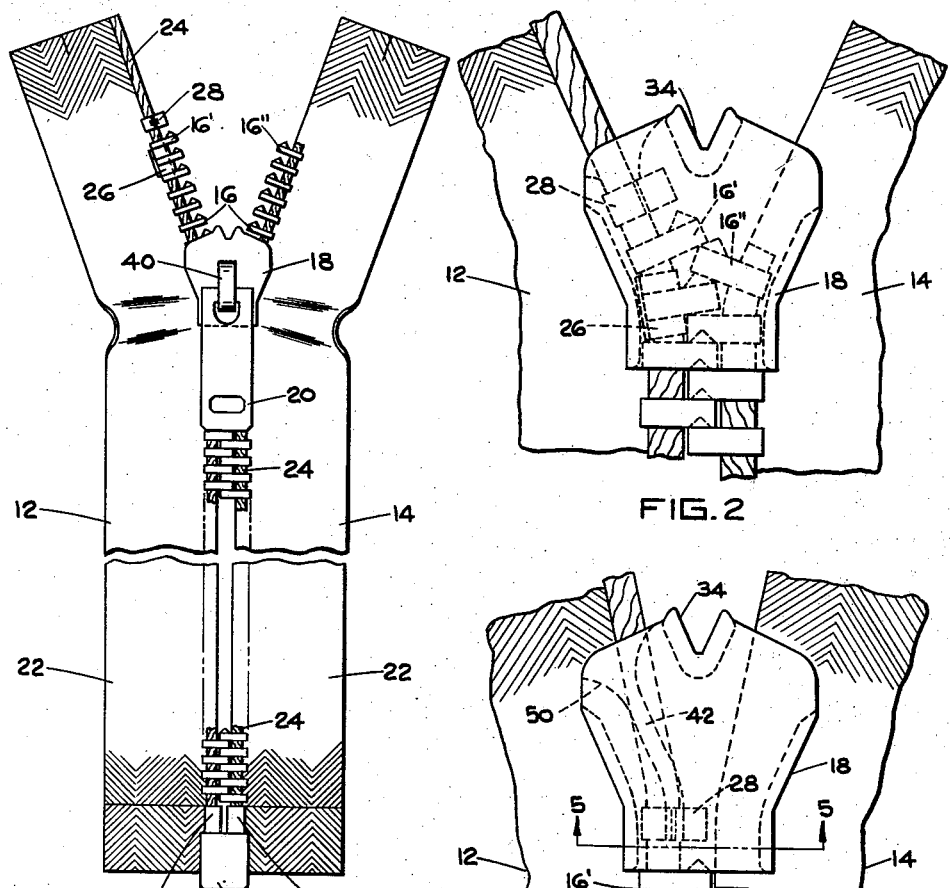
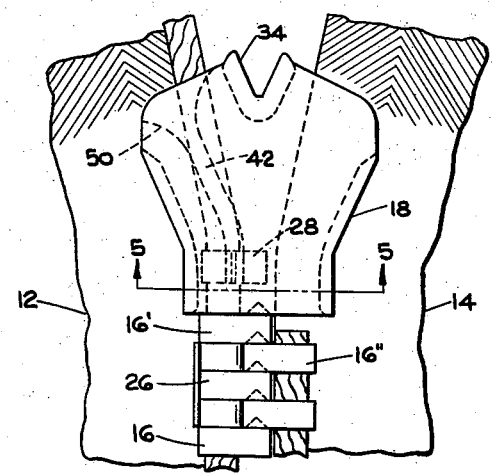
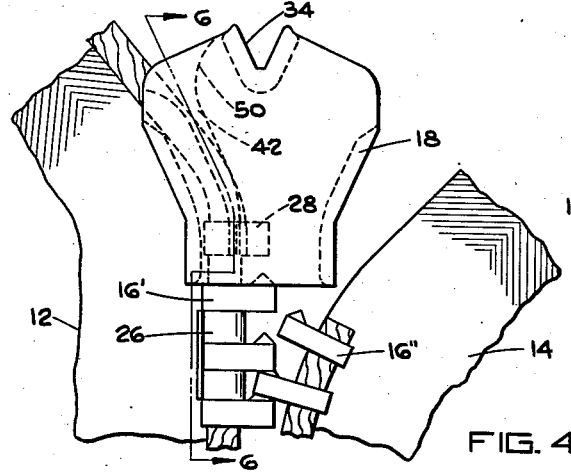
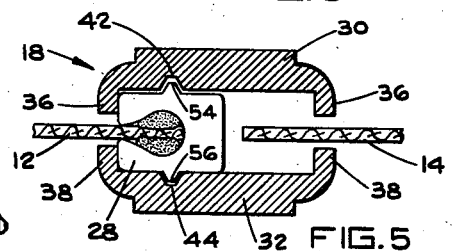
INVENTOR.
ROBERT I. PRUPIS
BY James and Franklin
His Attorneys Nov. 20, 1951 R. I. PRUPIS 2,575,502
QUICK DISASSEMBLY SLIDE FASTENER
Filed April 5, 1949 3 Sheets-Sheet 2

INVENTOR.
ROBERT I. PRUPIS
BY James and Franklin
Attorneys

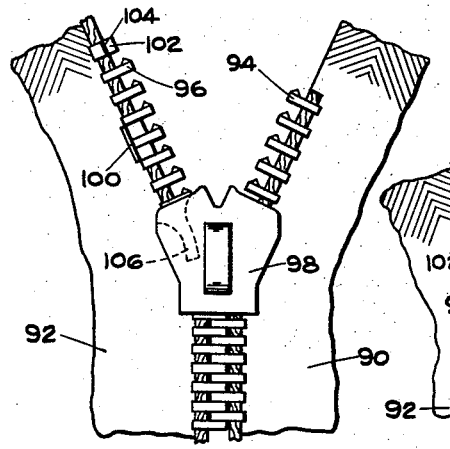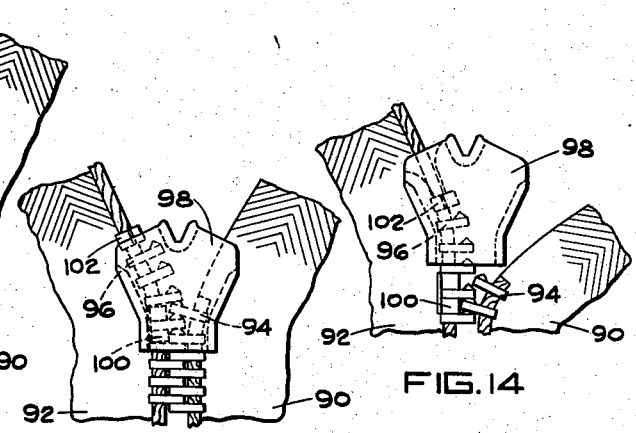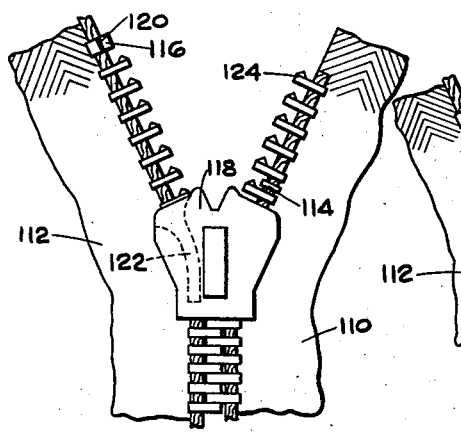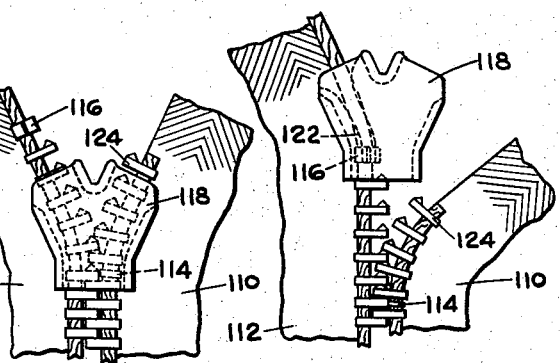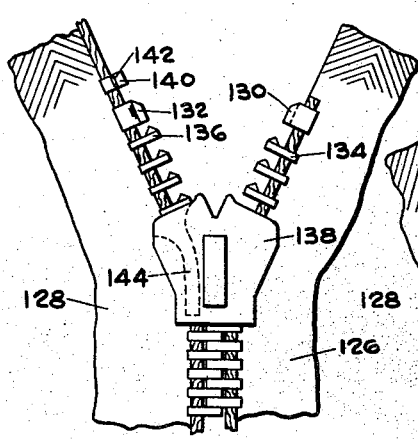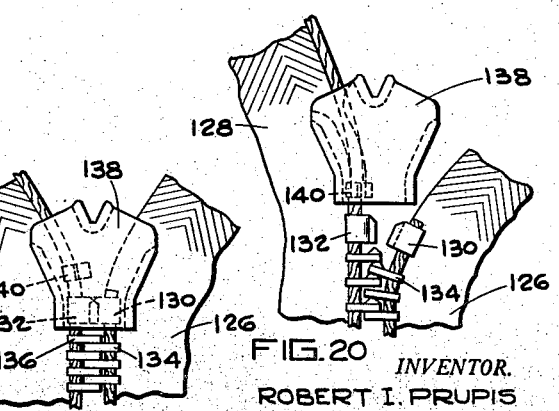

Patented Nov. 20, 1951

2,575,502

UNITED STATES PATENT OFFICE 2,575,502

QUICK DISASSEMBLY SLIDE FASTENER

Robert I. Prupis, Irvington, N. J., assignor to Conmar Products Corporation, Newark, N. J., a corporation of New Jersey Application April 5, 1949, Serial No. 85,553

10 Claims. (Cl. 24—205.11)

The present invention relates to slide fasteners, and more particularly to slide fasteners of the quick disassembly type.

In quick disassembly slide fasteners, a releasing end stop, or so-called "slip stop," is provided for stopping the slider when drawn with a normal closing force. However, a strong pull draws the slider past this temporary or releasing end stop, whereupon the stringers are free to be separated by quick stripping action without moving the slider back to the bottom stop. To accomplish this quick stripping action, the slider must be released from one stringer, usually termed the slider-releasing stringer, and retained on the other stringer, usually termed the slider-retaining stringer, so that the slider, after quick stripping, may be returned to the bottom stop for reassembly of the two stringers.

Prior to my invention it was necessary to make the slider-retaining stringer with a greater number of fastener elements than the slider-releasing stringer by an amount equal to a distance slightly greater than the length of the slider. In other words, the so-called "metal-length" of the slider-retaining stringer was greater than that of the slider-releasing stringer to insure retention of the slider on the slider-retaining stringer while permitting disengagement of the slider-releasing stringer from the slider when the stringers were stripped apart. Manufacturing stringers with different numbers of fastener elements or so-called "scoops" thereon complicated the mass production of the fastener; it required making one-half of a customer's order with one scoop count and the other half of the order with another scoop count. Moreover, when the finished fastener was incorporated in a jacket or the like, it presented an unfinished appearance. When the slider was halted by the releasing end stop, the extra fastener elements on the slider-retaining stringer were exposed above the slider. To the uninformed the exposed fastener elements would indicate that the fastener was not completely closed. When the slider was pulled up to cover these exposed fastener elements, the slider would be moved beyond the releasing end stop, permitting the stringer to be stripped apart, although it was not really intended to open the fastener or jacket.

Quick disassembly slide fasteners have been made with nearly equal metal-length, but in such prior constructions some mechanical addition or contrivance which functions as a releasing end stop is located at the top of the fastener, with at least a portion thereof exposed outside of the slider when the fastener is in its closed position. Such hardware is expensive to make and attach, and is bulky and unsightly. A fastener thus made does not provide the clean appearance of a quick disassembly slide fastener of the type having the releasing end stop disposed on the chain and intermediate at least a pair of fastener elements, or which is otherwise small and inconspicuous with the releasing stop element or elements of a size substantially the same as the fastener elements.

One of the primary objects of the invention is to provide a quick disassembly slide fastener of the type having the releasing end stop within the fastener chain, and wherein the slider reaches the positive top stop when arrested by the slip stop. Another object is to have the slider conceal or cover the topmost fastener elements on both stringers, and preferably also the releasing end stop, when the slider is halted by the releasing end stop.

Still another object of the invention is to provide a quick disassembly slide fastener which can be sewn or incorporated into a jacket in the same way as an ordinary separable fastener, without necessitating changes in the patterns for the garment because a quick disassembly type of separable slide fastener is used.

A further object of the invention is to provide a quick disassembly slide fastener which is manufactured with the same scoop count or metal-length on both stringers.

Still a further object of the invention is to provide a quick disassembly slide fastener having a neat, finished appearance, devoid of bulky, extraneous hardware or contrivances at the top thereof which are exposed outside of the slider when the fastener is in its closed position.

In all forms of the invention, the slide fastener is provided with a releasing end stop secured to the fastener near the top thereof, and preferably though not necessarily intermediate at least a pair of adjacent fastener elements. The number of fastener elements on each stringer is preferably equal, and if not, is such that the distance between the topmost elements on both stringers is less than the length of the slider. When the slider is temporarily halted by the releasing end stop, the topmost fastener elements on both stringers preferably are covered by the slider. A positive top stop is secured adjacent the topmost fastener element on one stringer to retain the slider thereon and is formed to cooperate with the slider in a manner which will enable it to pass into the slider channel a distance sufficient to permit the slider to clear the topmost element on the other stringer before finally halting the movement of the slider.

To accomplish the foregoing general objects, and other more specific objects which will hereinafter appear, my invention resides in the novel quick disassembly slide fastener components and their relationship one to another as are hereinafter more particularly described in the following specification. The specification is accompanied by drawings in which:

Fig. 1 is a plan view of a quick disassembly type of slide fastener embodying some of the principles of the present invention;

Fig. 2 shows the upper end of the slide fastener with the releasing end stop as it begins to arrest movement of the slider, the slider pull and lug being omitted for the purpose of clarity in illustration;

Fig. 3 is a view similar to Fig. 2 with the slider moved beyond the releasing end stop and prior to stripping the stringers of the fastener apart;

Fig. 4 is a view similar to Fig. 3 showing the fastener as the stringers are being stripped apart;

Fig. 5 is a cross section taken approximately in the plane of line 5—5 of Fig. 3;

Figs. 12, 13 and 14 show the upper end of a slide fastener in which the scoop count or metal length of the stringers is not the same;

Figs. 15, 16 and 17 show the upper end of a slide fastener in which some scoops are exposed above the slider; and Figs. 18, 19 and 20 show the upper end of a slide fastener utilizing a different form of releasing end stop.

Figure 6:
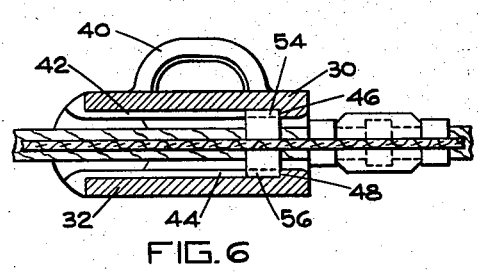
Fig. 6 is a cross section taken approximately in the plane of line 6—6 of Fig. 4.

Referring to the drawings, particularly Figs. 1 through 8, the quick disassembly slide fastener comprises stringers 12 and 14, each provided with spaced, interlockable fastener elements 16 and a slider 18 movable therealong by means of a suitable handle or so-called "pull" 20. The stringers 12 and 14 comprise tapes 22 having beaded edges 24 about which the fastener elements 16 are clamped or secured. The beaded edges 24 are formed in any suitable manner, but preferably are formed by sewing cords upon opposite sides of the edge of tapes 22. Preferably, the same number of fastener elements 16 are secured to the stringer 12 and the stringer 14 so that the topmost fastener element on the stringer 12 is interlockable with the topmost fastener element on the stringer 14. The topmost fastener elements on the stringers 12 and 14 are designated 16' and 16", respectively.

A releasing end stop or so-called "slip stop" 26 is located near the closed end of the slide fastener. One stringer, in this case stringer 12, has the releasing end stop 26 secured thereto intermediate adjacent fastener elements. The stringer 12 also is provided with a true or permanent top stop 28 which serves to retain the slider 18 thereon; hence, stringer 12 may be termed the slider-retaining stringer. The stringer 14 has its beaded edge reduced, as by cutting off the cords above the topmost fastener element 16", to facilitate the disengagement of the slider and stringer 14 when the stringers are to be stripped apart. The stringer 14 hence may be termed the slider-releasing stringer.

The slider 18 comprises the usual spaced top and bottom "wings" 30 and 32, respectively, joined by neck or post 34. The top wing 30 is provided with inturned rails or flanges 36 and the bottom wing 32 with inturned rails or flanges 38 which, together with the neck or post 34, form the usual Y-shaped channel. The "pull" 20 is secured to a lug 40 provided on the top wing 30.

Figure 7:
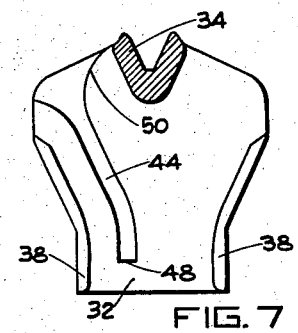
Fig. 7 is a plan view of the inside surface of the lower wing of one form of slider used in the present invention.

In its more specific aspects and as shown in Figs. 3 to 7, the inner surfaces of the slider's top and bottom wings 30 and 32 are provided with grooves 42 and 44, having any suitable contour, such as a U- or V-shape. The grooves 42 and 44, preferably formed by a stamping operation, are located on the slider-retaining stringer side of the slider. As shown in Fig. 7, the groove in each wing extends from the edge of the slider adjacent the neck 34 down into the stem portion of the Y-shaped slider channel, and just short of the narrow end of the slider. Fig. 6 shows how the ends of the grooves 42 and 44 provide shoulders or abutments 46 and 48, respectively. The lead-in portions of the grooves at the neck areas preferably are flared or widened, as is indicated at 50 in Figs. 3, 4 and 7.

Figure 8:
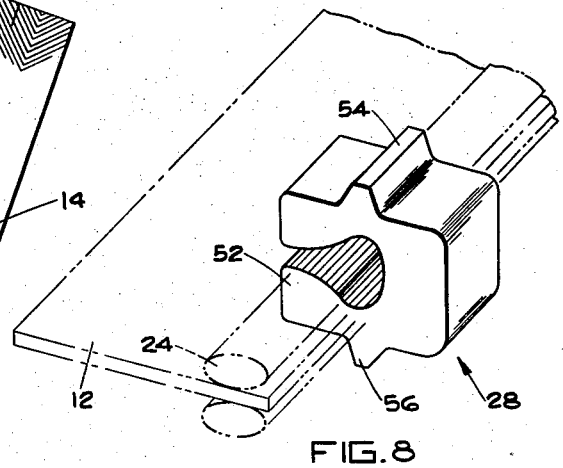
Fig. 8 is a perspective view of one form of positive top stop which may be used with the slide fastener of the present invention, the tape to which the stop is attached being shown in phantom.

As best illustrated in Fig. 8, the positive or true top stop 28 is formed with a pair of jaws 52 which are clamped about the beaded edge of the tape 24. The stop 28 is formed with a pair of rib-like projections 54 and 56 on opposite sides thereof so that when the jaws 52 are clamped onto the beaded edge of the tape, the projections 54 and 56 will extend lengthwise of the fastener, and perpendicular to the plane of the fastener. The projections 54 and 56 are formed with a configuration which is complementary to the contour of the grooves 42 and 44. Stops 28 may be made by extruding or rolling a continuous strip to the desired contour and severing sections therefrom of desired size.

The slide fastener illustrated is of the fully-separable type having the usual separable bottom stop construction, the one shown in Fig. 1 being disclosed in U. S. Letters Patent 2,216,794 to Frederick Ulrich, granted October 8, 1940. It shall be understood that the terms "top" and "bottom" are here used as is customary in the art, for the fastener may, of course, be used in any position. The separable bottom stop includes a stud 58 clamped onto the beaded edge 24 of the stringer 12, and a clip 60 clamped onto the stud 58. This provides a socket for removably receiving a pin 62 which is clamped onto the beaded edge of the stringer 14. As is well known in the art, when the slider 18 is in its lowermost position on the slide fastener and in contact with clip 60, the pin 62 may be threaded through the slider 18 and into or out of the socket.

The releasing end stop or "slip stop" 26 is of the type disclosed in the pending application of Otto J. Moehler, Serial No. 29,837, filed May 28, 1948, having the same assignee as the present apwithstanding the presence of the beaded edge, designated 24'.

A quick disassembly type of slide fastener provided with a slider having an enlarged tape slot is the subject matter of the pending patent application of Frederick Ulrich, Serial No. 73,097, filed January 27, 1949, having the same assignee as the present application. It is within the scope of the invention to provide a slider with an enlarged tape slot in accordance with the various constructions shown in the pending Ulrich patent application, the slider illustrated herein being but one example thereof.

Figure 9:
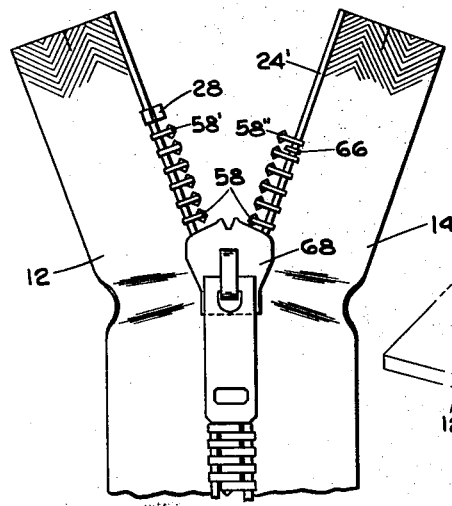
Fig. 9 is a plan view of a quick disassembly type of slide fastener embodying a number of modifications of the present invention.

The slider 68 is otherwise the same as the slider 18 in that a pair of grooves 78 and 80 (Fig. 10), terminating in abutments, are formed therein in the same manner as the grooves 42 and 44 (Figs. 3-7). The positive top stop used in the fastener shown in Fig. 9 therefore may be exactly the same as the previously described top stop 28. It will be apparent that the slider 68 may be used in lieu of the slider 18 in the fastener illustrated in Fig. 1, thereby eliminating the necessity for removing the cords above the topmost fastener element 16". Also whether the slider 68 or the slider 18 is used, it is disposed on the fastener with its narrow end adjacent, or facing, the narrow end of the slider 60 when a fully separable coupling means of the type illustrated in Fig. 9 is used, for obviously such a coupling may be used with the fastener shown in Fig. 1.

Figure 11:
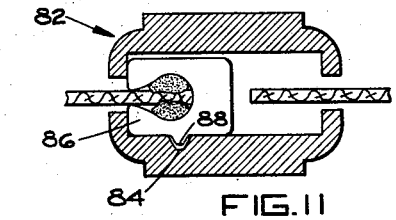
Fig. 11 is a view similar to Figs. 5 and 10 showing a modified form of slider and cooperating top stop which may be used in the present invention.

It is within the scope of the invention to form the slider with but one groove, terminating in an abutment, instead of forming a groove in both wings. Likewise, it is within the scope of the invention to form the top stop 28 with but one corresponding rib-like projection. This is shown in Fig. 11, in which a slider 82 is provided with a groove 84 on the inner surface of the bottom wing. Correspondingly, the positive top stop designated 86 is formed with but one rib-like projection 88 on its bottom surface. It is apparent that the slider may be formed with the groove on the inner surface of the top wing, in which case the top stop would be provided with a projection on its upper surface.

Figs. 12, 13 and 14 illustrate a modification of the invention, in which the scoop count or metal length of the stringers is not the same. Slider-releasing stringer 90 has fewer scoops than slider-retaining stringer 92, but the difference in length, or, in other words, the spacing between the topmost element 94 of stringer 90 and the topmost element 96 of stringer 92 is less than the length of the slider 98. The slip stop 100 is of such a type and is so located that it does not arrest the upward movement of the slider 98 until the slider has reached the positive top stop 102. In other words, the slip stop 100 is located below the positive stop 102 an amount less than the length of the slider 98, and more specifically, such an amount less as to permit the top of the slider to reach the positive end stop when the slider is temporarily halted by the releasing end stop within the slider channel. This relation is shown in Fig. 13, and it is evident that the top scoops 94 and 96 are located within the slider 98, thus concealing the inequality in the metal length of the stringers. As before, the positive top stop 102 has a projection 104, and the slider 98 has a mating groove 106, thus affording additional or continued upward movement of the slider beyond the point where it is arrested by the slip stop 100. The groove 106 has a length such that when the slider is moved to uppermost position, as shown in Fig. 14, the stringer 90 may be stripped sidewardly from the slider, the uppermost scoop 94 then being located beneath the bottom edge of the slider. Because the topmost scoop 94 is lower than the scoop 96, the groove 106 may, if desired, be made shorter in length than was the case when the stringers had equal scoop count.

The modification of Figs. 12, 13 and 14 shows that while I consider it preferable, it is not essential to have an equal scoop count. This modification still retains the advantage that the slider appears to be fully raised when stopped by the slip stop, thus avoiding any tendency to pull the slider too far when not intending to strip the fastener open.

Figs. 15, 16 and 17 show another modification of the invention. In this fastener the slider-releasing stringer 110 has the same scoop count as the slider-retaining stringer 112. The fastener has a slip stop 114 and a positive top stop 116. In the present arrangement, however, the slip stop 114 is located lower on the fastener in the modifications previously described, so that when the slider 118 is arrested by the slip stop a few scoops are exposed above the slider, as shown in Fig. 16. As shown in Fig. 17, if the slider 118 is forcibly pulled past the slip stop it moves upward far enough to release the stringer 110. For this purpose the positive top stop 116 is provided with a projection 120, and the slider is provided with a mating groove 122, as was previously described. The groove is almost as long as the slider, and is of such length that when the slider is raised to uppermost position the topmost scoop 124 of the stringer 110 may be so pulled sidewardly as to escape beneath the bottom edge of the slider.

The modification of Figs. 15, 16 and 17 illustrates the fact that one advantage of the invention, namely, the possibility of having an equal scoop count for both stringers, may be retained without necessarily concealing the uppermost scoops within the slider when the slider is arrested by the slip stop. However, I consider it preferable to so locate the slip stop that the slider will reach the top stop, and so conceal the scoops.

It is within the scope of the invention to use any type of releasing end stop which is small and inconspicuous and which will not detract from the neat, finished appearance of the fastener when the slider is halted in fastener closing position. The releasing end stop constructions hereinbefore described are of the type which are disposed on the chain intermediate at least a pair of fastener elements. While this type of releasing end stop is preferred, its use is not essential to realize the benefits and advantages of the invention.

Figs. 18, 19 and 20 show another modification of the invention in which another form of releasing end stop is used. In this fastener the slider releasing stringer 126 has the same scoop count as the slider retaining stringer 128. The fastener has a releasing end stop comprising two members 130 and 132 secured to the stringers 126 and 128, respectively, beyond the endmost fastener elements 134 and 136 of the respective stringers. This form of releasing end stop is of the type disclosed in the pending application of Otto J. Moehler, Serial No. 35,343, filed June 26, 1948, having the same assignee as the present invention. This type of releasing end stop operates upon the principle of the members 130 and 132 co-acting with each other within the slider 138 to temporarily arrest the movement of the slider, as plication. For the purpose of this invention it is sufficient to state that this type of releasing end stop is small and inconspicuous and secured to a stringer intermediate at least a pair of fastener elements and co-acts with a fastener element on the opposite stringer within the slider to cause the slider to be halted when a normal pull is exerted. However, when subjected to a stronger pull, the slider moves past the releasing end stop 26 and is finally halted by the permanent or positive top stop 28.

Prior to my invention, when the slider was moved beyond the releasing end stop to uppermost position, preliminary to stripping the stringers apart, the permanent or positive top stop was located at or near the top end of the slider. In most cases it was located above the slider. If the slider and top stop were formed in a manner to allow the top stop to pass into the slider, it was for only a very short distance, the top stop being finally located at, though within, the top of the slider. In either case it was necessary to provide more fastener elements on the stringer to which the top stop was attached than on the slider-releasing stringer, in order to permit the lower end of the slider to clear the topmost fastener element on the slider-releasing stringer during the stripping operation. In other words, it was necessary to make the metal-length of one stringer longer than the other.

In accordance with one feature of my invention, it is not essential to provide a greater number of fastener elements upon the slider-retaining string than upon the slider-releasing stringer to permit the stringers to be stripped apart. Due to the cooperative relationship of the described slider and positive top stop constructions, a quick disassembly slide fastener may be made with stringers of equal length. For reasons hereinbefore explained, this is most desirable. Moreover, depending upon the location of the top stop, the length of the slider, and hence the length of the groove and location of the abutment, a variation of one of two fastener elements, more or less, on one stringer compared to the other, is no longer critical. The fastener still will operate satisfactorily and have a clean, neat appearance and will not complicate the pattern work of the manufacturer who uses the fastener in a garment. This tolerance in scoop-count is desirable for the manufacturer of the slide fastener, as the scoop attaching machines work at very high speed, and such slight errors in scoop count are possible.

As shown in Fig. 2, when the movement of the slider 18 is temporarily halted by the releasing end stop 26, the endmost fastener elements 16' and 16" and the top stop 28 disappear into and are disposed within the channel of the slider 18. Thus, when the slider is temporarily halted by the releasing end stop 26, which also is disposed within the slider 18, the fastener presents a neat, finished appearance devoid of any disfiguring extraneous hardware or contrivances at the top of the fastener.

Fig. 3 illustrates the relative positions of the releasing end stop 26, the positive top stop 28, the endmost fastener elements 16' and 16" and the slider 18 when the slider is moved beyond the releasing end stop and is finally halted by the positive top stop. By providing the slider 18 with the grooves 42 and 44, and the top stop 28 with the projections 54 and 56, the slider 18 is permitted to move upwardly until finally halted by the engagement of the abutments 46 and 48 (Fig. 6) with the projections 54 and 56. In this way the top stop 28 passes into the slider 18 a substantial distance, in fact, nearly the entire length of the slider, before finally halting the movement of the slider. The slider will clear the topmost fastener element 16" on the slider-releasing stringer to thereby permit the stringers to be stripped apart as illustrated in Fig. 4, notwithstanding the equal length of the two stringers.

Figure 10:
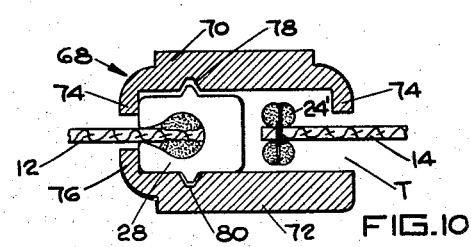
Fig. 10 is a view similar to Fig. 5 illustrating a form of slider which may be used with the slide fastener shown in Fig. 9.

Figs. 9 and 10 illustrate a quick disassembly slide fastener embodying a number of modifications of the construction heretofore described with respect to Figs. 1 through 8. Instead of the pin and clip type of fully-separable fastener illustrated in Fig. 1, it is within the scope of the invention to use any type of separable coupling means. A fully-separable end stop assembly may be used of the type disclosed in the pending application of Albert Bashover, Serial No. 59,330, filed November 10, 1948, now Patent No. 2,533,230, patented May 15, 1951 having the same assignee as the present application. This permits partial opening from either end whenever desired. When this type of separable end stop assembly is selected, fastener elements of the double-acting type 58 are used in lieu of the one-way type of fastener element previously illustrated. Double-acting fastener elements are well-known in the art and may be symmetrical or asymmetrical. They permit meshing or unmeshing of the fastener elements in either direction of movement of the slider. Generally, this type of fully-separable coupling comprises an extra slider 60 and two long pins 62 and 64, one of which, 62, retains the slider. The other side of the slider 60 acts as a socket to receive the other pin 64.

It is within the scope of the invention to use any type of releasing end stop which is small and inconspicuous and which does not detract from the neat finished appearance of the fastener. Instead of the releasing end stop construction of the type illustrated in Fig. 1, a releasing end stop, designated 66, may be of the type disclosed in the pending application of Claude Disinger, Serial No. 36,726, filed July 2, 1948, now Patent No. 2,558,239, patented June 26, 1951, having the same assignee as the present application. Also, instead of the releasing end stop being secured to the slider-retaining stringer 12, it may be secured to the slider-releasing stringer 14. This type of releasing end stop also co-acts with a fastener element on the opposing stringer. The construction and principle of operation of the releasing end stop 66, however, is such that it does not require the presence of a slider rail surface or even portions thereof on its side of the slider. Engagement of an opposing fastener element with the releasing end stop 66 causes the beaded edge, upon which the releasing end stop is mounted, to be flexed to provide resilient resistance to the passage of the slider and, hence, it may be attached to either stringer 12, or the stringer 14, as shown. This permits the use of a slider 68 having a rail removed on the slider-releasing stringer side.

As shown in Fig. 10, the slider 68 comprises top and bottom wings 70 and 72, the top wing having the usual pair of rails 74, and the bottom wing having but one rail 76 on the slider-retaining stringer side. The omission of the fourth rail permits the elimination of the cord cutting operation above the topmost fastener element, designated 58" in Fig. 9. The enlarged tape slot, designated T in Fig. 10, permits the stringers 12 and 14 to be stripped apart when the slider 68 is moved beyond the releasing end stop 66 not-shown in Fig. 19. As shown in Fig. 20, when the slider 138 is forcibly pulled past the releasing and stop, it moves upward far enough to release the stringer 126. For this purpose the positive top stop 140 is provided with a projection 142 and the slider 138 is provided with a mating groove 144. As was previously described, the groove is almost as long as the slider and is of such length that when the slider is raised to its uppermost position, as shown in Fig. 20, the topmost scoop 134 and slip stop 130 of the stringer 126 may be so pulled sidewardly as to escape beneath the bottom edge of the slider.

All these modifications may be provided with a slider requiring cord removal, as in Fig. 1, or permitting cord retention, as in Fig. 9. All may have a conventional separable bottom stop, as in Fig. 1, or the special bottom stop shown in Fig. 9.

It is believed that the construction, method of manufacture and theory of operation of my improved quick disassembly slide fastener, as well as the advantages thereof, will be apparent from the foregoing detailed description. The cooperative relationship of the positive or permanent top stop and slider constructions permits the realization of a superior fastener from the standpoint of its incorporation in the garment by the garment manufacturer, and also because of its neat appearance in the finished article or garment. It is handled by the garment manufacturer like a simple ordinary fastener, and when in place it has the neat, inconspicuous and evenly finished appearance of a simple ordinary fastener, yet the user has the advantage of the quick disassembly feature. Moreover, the manufacture of the fastener itself is simplified because a satisfactory fastener element count is easily obtained.

While the positive or true top stop has been illustrated as having the projection or projections extending the entire width of the stop in the form of a rib, it will be apparent that the projection or projections may be formed as any suitably shaped protuberance anywhere along the width of the stop as long as it possesses a contour which will cooperate with the selected configuration of the groove in the slider.

While the slide fasteners as heretofore described are of the fully-separable type, the invention is utilizable with a fastener having a bottom stop which is not fully separable, such as disclosed in pending application, Serial No. 613,890, filed August 31, 1945, of David Rabinow and Otto J. Moehler, having the same assignee as the present application.

It will be apparent that while I have shown and described my invention in several preferred forms, changes may be made in the structures disclosed without departing from the spirit of the invention as sought to be defined in the following claims.

I claim:

1. A quick disassembly slide fastener comprising a slider-retaining stringer, a slider-releasing stringer, each of said stringers being formed of tape having spaced, interlockable fastener elements secured thereto, a slider having a Y-shaped channel, a releasing end stop secured to the fastener near one end thereof, and a positive end stop secured to the slider-retaining stringer, said positive end stop being spaced beyond the endmost element on the slider-releasing stringer by an amount less than the length of the slider, and said releasing end stop being located below the positive stop an amount less than the length of the slider so as to permit the top of the slider to reach the positive end stop when the slider is temporarily halted by the releasing end stop within the slider channel, said slider having a stop surface for engaging said positive end stop, said stop surface being so located within the slider that when the slider is moved beyond the releasing end stop and finally halted by the positive end stop, the positive end stop is received within the slider channel a distance sufficient to permit the slider to clear the endmost element on the slider-releasing stringer, whereby the stringers may be stripped apart.

2. A quick disassembly slide fastener comprising a slider-retaining stringer, a slider-releasing stringer, each of said stringers being formed of tape havng spaced, interlockable fastener elements secured thereto, a slider having a Y-shaped channel, a releasing end stop secured to the fastener near one end thereof, and a positive end stop secured to the slider-retaining stringer, said positive end stop being spaced beyond the endmost element on the slider-releasing stringer by an amount less than the length of the slider, and said releasing end stop being located below the positive stop such an amount less than the length of the slider as to permit the top of the slider to reach the positive end stop when the slider is temporarily halted by the releasing end stop within the slider channel, said positive end stop being provided with a projection and said slider being formed wth a groove extending from the top of the slider toward but not reaching the bottom and dimensioned so that said projection will ride therein a distance sufficient to permit the slider to clear the endmost element on the slider-releasing stringer when the slider is moved beyond the releasing end stop and finally halted, whereby the stringers may be stripped apart.

3. A quick disassembly slide fastener comprising a slider-retaining stringer, a slider-releasing stringer, each of said stringers being formed of tape having spaced, interlockable fastener elements secured thereto, a slider having spaced top and bottom wings joined by a neck at one end thereof to form a Y-shaped channel, a releasing end stop secured to the fastener near one end thereof, and a positive end stop secured to the slider-retaining stringer, said positive end stop being spaced beyond the endmost element on the slider-releasing stringer by an amount less than the length of the slider, and said releasing end stop being located below the positive stop an amount less than the length of the slider so as to permit the top of the slider to reach the positive end stop when the slider is temporarily halted by the releasing end stop within the slider channel, said positive end stop being formed with a rib-like projection extending longitudinally of the fastener and perpendicularly with respect to the plane of the fastener, and said slider being formed with a groove on the inner face of one of said wings, said groove being located on the slider-retaining stringer-side of the slider and extending from the edge of the wing adjacent the neck to a point within the stem portion of the Y-shaped channel, where it terminates in an abutment, so that said projection will ride in said groove until it engages said abutment to permit the slider to clear the endmost element on the slider-releasing stringer when the slider is moved beyond the releasing end stop and finally halted, whereby the stringers may be stripped apart.

4. A quick disassembly slide fastener comprising a slider-retaining stringer, a slider-releasing stringer, each of said stringers being formed of tape having spaced, interlockable fastener elements secured thereto, a slider having spaced top and bottom wings joined by a neck at one end thereof to form a Y-shaped channel, a releasing end stop secured to the fastener near one end thereof, and a positive end stop secured to the slider-retaining stringer, said positive end stop being spaced beyond the endmost element on the slider-releasing stringer by an amount less than the length of the slider, and said releasing end stop being located below the positive stop such an amount less than the length of the slider as to permit the top of the slider to reach the positive end stop when the slider is temporarily halted by the releasing end stop within the slider channel, so that the endmost fastener elements on the slider retaining stringer and the releasing end stop are covered by the slider when the slider is temporarily halted by the releasing end stop, said positive end stop being formed with a pair of opposed rib-like projections extending longitudinally of the fastener and perpendicularly with respect to the plane of the fastener, said slider being formed with a groove on the inner face of each of said wings, each of said grooves being located on the slider-retaining stringer-side of the slider and extending from the edge of each wing adjacent the neck, where the groove is widened to facilitate entry of a projection therein, to a point within the stem portion of the Y-shaped channel, where it terminates in an abutment, so that said projections will ride in said grooves until they engage said abutments to permit the slider to clear the endmost element on the slider-releasing stringer when the slider is moved beyond the releasing end stop and finally halted, whereby the stringers may be stripped apart.

5. A quick disassembly slide fastener comprising a slider-retaining stringer, a slider-releasing stringer, each of said stringers being formed of tape having spaced, interlockable fastener elements secured thereto, said stringers being provided with the same number of fastener elements, a slider having a Y-shaped channel, a releasing end stop secured to the fastener near one end thereof, and a positive end stop secured to the slider-retaining stringer, said releasing end stop being located below the positive stop an amount less than the length of the slider so as to permit the top of the slider to reach the positive end stop when the slider is temporarily halted by the releasing end stop within the slider channel, said slider having a stop surface for engaging said positive end stop, said stop surface being so located within the slider that when the slider is moved beyond the releasing end stop and finally halted by the positive end stop, the positive end stop is received within the slider channel a distance sufficient to permit the slider to clear the endmost element on the slider-releasing stringer, whereby the stringers may be stripped apart.

6. A quick disassembly slide fastener comprising a slider-retaining stringer, a slider-releasing stringer, each of said stringers being formed of tape having spaced, interlockable fastener elements secured thereto, said stringers being provided with the same number of fastener elements, a slider having spaced top and bottom wings joined by a neck at one end thereof to for a Y-shaped channel, a releasing end stop secured to the fastener near one end thereof, and a positive end stop secured to the slider-retaining stringer, said releasing end stop being located below the positive stop such an amount less than the length of the slider as to permit the top of the slider to reach the positive end stop when the slider is temporarily halted by the releasing end stop, so that the endmost fastener elements on the slider retaining stringer and the releasing end stop are covered by the slider when the slider is temporarily halted by the releasing end stop, said positive end stop being provided with a projection and said slider being formed with a groove on the inner face of one of said wings, said groove being located on the slider-retaining stringer-side of the slider and extending from the edge of the wing adjacent the neck to a point within the stem portion of the Y-shaped channel so that said projection will ride in said groove a distance sufficient to permit the slider to clear the endmost element on the slider-releasing stringer when the slider is moved beyond the releasing end stop and finally halted, whereby the stringers may be stripped apart.

7. A quick disassembly slide fastener comprising a slider-retaining stringer, a slider-releasing stringer, each of said stringers being formed of tape having spaced, interlockable fastener elements secured thereto, said stringers being provided with the same number of fastener elements, a slider having spaced top and bottom wings joined by a neck at one end thereof to form a Y-shaped channel, a releasing end stop secured to one of said stringers intermediate at least a pair of adjacent fastener elements, and a positive end stop secured to the slider-retaining stringer, said releasing end stop being located below the positive stop an amount less than the length of the slider so as to permit the top of the slider to reach the positive end stop when the slider is temporarily halted by the releasing end stop, said positive end stop being formed with a rib-like projection extending longitudinally of the fastener and perpendicularly with respect to the plane of the fastener and said slider being formed with a groove on the inner face of one of said wings, said groove being located on the slider-retaining stringer-side of the slider and extending from the edge of the wing adjacent the neck to a point within the stem portion of the Y-shaped channel where it terminates in an abutment so that said projection will ride in said groove until it engages said abutment to permit the slider to clear the endmost element on the slider-releasing stringer when the slider is moved beyond the releasing end stop and finally halted, whereby the stringers may be stripped apart.

8. A quick disassembly slide fastener comprising a slider-retaining stringer, a slider-releasing stringer, each of said stringers being formed of tape having spaced, interlockable fastener elements secured thereto, said stringers being provided with the same number of fastener elements, a slider having spaced top and bottom wings joined by a neck at one end thereof to form a Y-shaped channel, a releasing end stop secured to one of said stringers intermediate at least a pair of adjacent fastener elements, and a positive end stop secured to the slider-retaining stringer, said releasing end stop being located below the positive stop such an amount less than the length of the slider as to permit the top of the slider to reach the positive end stop when the slider is temporarily halted by the releasing end stop, so that the endmost fastener elements on the slider retaining stringer and the releasing end stop are covered by the slider when the slider is temporarily halted by the releasing end stop, said positive end stop being formed with a pair of opposed rib-like projections extending longitudinally of the fastener and perpendicularly with respect to the plane of the fastener and said slider being formed with a groove on the inner face of each of said wings, each of said grooves being located on the slider-retaining stringer-side of the slider and extending from the edge of each wing adjacent the neck, where the groove is widened to facilitate entry of a projection therein, to a point within the stem portion of the Y-shaped channel, where it terminates in an abutment, so that said projections will ride in said grooves until they engage said abutments to permit the slider to clear the endmost element on the slider-releasing stringer when the slider is moved beyond the releasing end stop and finally halted, whereby the stringers may be stripped apart.

9. A quick disassembly slide fastener comprising a slider-retaining stringer, a slider-releasing stringer, each of said stringers being formed of beaded edge tape having spaced, interlockable fastener elements secured thereto, said slider-releasing stringer having the beaded edge extending beyond its endmost element, a slider having a Y-shaped channel, a releasing end stop secured to the fastener near one end thereof, said slider being formed with a tape slot dimensioned to permit the slider, when beyond the releasing end stop and the endmost element on the slider-releasing stringer, to be released readily by the slider-releasing stringer notwithstanding the presence of beaded edge, and a positive end stop secured to the slider-retaining stringer, said positive end stop being spaced beyond the endmost element on the slider-releasing stringer by an amount less than the length of the slider, and said releasing end stop being located below the positive stop an amount less than the length of the slider so as to permit the top of the slider to reach the positive end stop when the slider is temporarily halted by the releasing end stop within the slider channel, and said slider having a stop surface for engaging said positive end stop, said stop surface being so located within the slider that when the slider is moved beyond the releasing end stop and finally halted by the positive end stop, the positive end stop is received within the slider channel a distance sufficient to permit the slider to clear the endmost element on the slider-releasing stringer, whereby the stringers may be stripped apart.

10. A quick disassembly slide fastener comprising a slider-retaining stringer, a slider-releasing stringer, each of said stringers being formed of beaded edge tape having spaced, interlockable fastener elements secured thereto, said stringers being provided with the same number of fastener elements, said slider-releasing stringer having the beaded edge extending beyond its endmost element, a slider having a Y-shaped channel, a releasing end stop secured to the fastener near one end thereof, said slider being formed with a tape slot dimensioned to permit the slider, when beyond the releasing end stop and the endmost element on the slider-releasing stringer, to be released readily by the slider-releasing stringer notwithstanding the presence of beaded edge, and a positive end stop secured to the slider-retaining stringer, said releasing end stop being located below the positive stop an amount less than the length of the slider so as to permit the top of the slider to reach the positive end stop when the slider is temporarily halted by the releasing end stop within the slider channel, and said slider having a stop surface for engaging said positive end stop, said stop surface being so located within the slider that when the slider is moved beyond the releasing end stop and finally halted by the positive end stop, the positive end stop is received within the slider channel a distance sufficient to permit the slider to clear the endmost element on the slider-releasing stringer, whereby the stringers may be stripped apart.

ROBERT I. PRUPIS.

REFERENCES CITED

The following references are of record in the file of this patent:

UNITED STATES PATENTS

| Number | Name | Date |
|---|---|---|
| 1,803,106 | Freysinger | Apr. 28, 1931 |
| 1,889,467 | Dalton | Nov. 29, 1932 |
| 1,910,953 | Johnson | May 23, 1933 |
| 2,177,599 | Murphy | Oct. 24, 1939 |
| 2,193,827 | Marinsky | Mar. 19, 1940 |
| 2,325,305 | Carlile | July 27, 1943 |
| 2,341,331 | Parkin | Feb. 8, 1944 |
| 2,422,093 | Griffin | June 10, 1947 |
| 2,423,202 | Morin | July 1, 1947 |
| 2,438,614 | Morin | Mar. 30, 1948 |
| 2,519,012 | Babcock | Aug. 15, 1950 |

FOREIGN PATENTS

| Number | Country | Date |
|---|---|---|
| 553,552 | Great Britain | of 1943 |